Patented Mar. 10, 1953

2,631,175

UNITED STATES PATENT OFFICE 2,631,175

PRODUCTION OF LIQUID POLYBUTADIENE

Willie W. Crouch, Bartlesville, Okla., assignor to Phillips Petroleum Company, a corporation of Delaware No Drawing. Application December 23, 1948, Serial No. 67,098

18 Claims. (Cl. 260—669)

This invention relates to a method for producing polymers of 1,3-butadiene. In one preferred embodiment the invention relates to the use of a series of steps at particular conditions adapted to produce a finished liquid polybutadiene of low color. Some of the specific aspects of the invention pertain to process steps resulting in formation of a low-molecular weight butadiene polymer material of controlled viscosity and which is free from dissolved solid polymers. The products of this invention find particular use in the fields of drying oils, coatings, adhesives and rubber compounding.

Numerous efforts have been made to polymerize diolefins in the presence of alkali metal catalysts and products ranging from liquid materials to rubber-like polymers have been reported. In the production of liquid polymers from open-chain conjugated diolefins, such as 1,3-butadiene, numerous difficulties have been involved in methods heretofore employed. While the polymer may have the characteristics of a liquid, that is, it may be regarded as a low molecular weight polymer, it frequently contains an appreciable quantity of higher molecular weight material which is dissolved in the liquid. The desirability of obtaining a product of controlled viscosity which is composed in its entirety of compounds of such molecular weight as to be of liquid character, and is therefore uniform throughout, is recognized but has been difficult to achieve. Another difficulty lies in the appearance of the final product, materials having pronounced color and opacity being frequently obtained.

An object of this invention is to produce liquid polymers of butadiene. Another object is to provide improvements in the sodium-catalyzed polymerization of 1,3-butadiene. A further object is to produce a low molecular weight butadiene polymeric material free from dissolved and/or suspended solid polymers. Yet another object is to provide liquid polybutadiene having very little color. Another object is to remove sodium or other alkali metal catalyst from polybutadiene in an improved manner. A further object is to provide a liquid polybutadiene of improved characteristics for use as an additive to drying oils. Other objects and advantages of the invention will be apparent to one skilled in the art from the accompanying disclosure and discussion.

I have now discovered a process for the production of polybutadiene wherein a substantially colorless, transparent liquid of controlled viscosity is readily obtained. The process of a preferred modification of the invention comprises the following steps: (1) removal of 1,2-butadiene and other deleterious materials from the 1,3-butadiene feed stock; (2) polymerization of the 1,3-butadiene obtained from the first step in the presence of an alkali metal catalyst and a suitable diluent, the reaction being carried out under carefully controlled reaction conditions, particularly temperature, catalyst condition and concentration, quantity of solvent, and rate of butadiene addition; (3) recovery of the product by some appropriate means such as by treatment with a small quantity of water followed by introduction of carbon dioxide to react with the alkali metal and organo-alkali metal compounds and precipitate alkali metal carbonates, removal of the precipitate, and stripping to separate the diluent from the liquid polymer. When operating according to the process of this invention, a polymer of low molecular weight is produced and the formation of high molecular weight compounds is excluded. The polybutadiene thus produced is a substantially colorless, transparent liquid which is free from dissolved solid polymeric material.

When operating according to the process of this invention, the first step which is essential for obtaining a satisfactory reaction and a product of superior quality is the removal of the isomeric diolefin, 1,2-butadiene, and other deleterious materials from the butadiene feed stream. Careful fractionation in an efficient fractionating column followed by a drying step will usually be satisfactory for the separation of 1,3-butadiene from materials which will either inhibit the polymerization or affect the character of the product. Substances which are removed by fractionation, in addition to 1,2-butadiene, include olefins such as butylenes, acetylenes such as methylacetylene, vinylacetylene and the like, methanol, aldehydes, ketones, and any other oxygenated compounds which may be present. The fractionated product is passed over a suitable drying agent such as bauxite, magnesium sulfate, calcium chloride, or any similar material to remove traces of moisture. In addition to or instead of fractional distillation, azeotropic distillation, extractive distillation with a high-boiling solvent, and/or liquid-liquid extraction with a selective solvent, may be employed to effect the desired production of high-purity butadiene, in accordance with methods understood in the art. Preferably butadiene is thus prepared in a purity of at least 98.0 weight per cent, with a maximum of 2.0 per cent of non-paraffinic impurities. By butadiene of 98.0 per cent purity, or a butadiene feed containing at least 98.0 per cent 1,3-butadiene, I means to include not only a mixture containing 1,3-butadiene in a concentration of at least 98.0 per cent of the total material present in the mixture, which is the usual feed employed in the process, but also mixtures in which there may be not more than 2 parts non-paraffinic materials per 98 parts butadiene plus any amount of paraffins (usually normal butane would be the only paraffin present). It is clear that any butane present would not be considered an impurity, but would act as diluent or solvent in the polymerization and be calculated as part of the solvent rather than as part of the butadiene feed.

The second step of the present process comprises polymerization of the 1,3-butadiene obtained from the first step in the presence of a finely divided alkali metal catalyst and a suitable diluent such as benzene, heptane, and the like, the reaction being carried out under carefully controlled reaction conditions. Care is taken to exclude oxygen from the reaction as its presence is harmful. Oxygen exerts an inhibiting effect on the reaction but if polymerization occurs, the product becomes resinous and has a tendency to form a viscous or hard mass, particularly at the higher temperatures of operation.

When carrying out the second step of this process, a solvent such as benzene is charged to a reactor, equipped with stirrer or other means for providing agitation, along with the finely divided alkali metal catalyst suspended in a suitable dispersing medium such as benzene, toluene, xylene, and the like. Prior to charging the ingredients, the reactor is flushed with 1,3-butadiene to insure exclusion of air or oxygen. The mixture is heated to the desired temperature, that is, in the range from 60 to 110° C., after which a portion of the 1,3-butadiene is introduced, e. g., an amount such that the concentration of the 1,3-butadiene in the solvent is in the range from 0.03 to 0.15 pound per pound of solvent. The reaction mixture is held at constant temperature and stirred until the reaction is initiated, as evidenced by an increase in temperature and a drop in pressure. The time usually required for the initiation period is in the range from 5 to 30 minutes. After the reaction has started additional 1,3-butadiene is charged at a rate ranging from 0.03 to 0.40 pound of the diolefin per hour per pound of solvent, the maximum rate of addition depending upon the ability to control the reaction, that is, the ability to remove heat from the reactor. Addition of butadiene is continued, preferably at a constant rate, until the concentration of polymer in the polymer-solvent mixture reaches the desired level. After the flow of diolefin is stopped, agitation of the reaction mixture is continued until the reaction is substantially complete as evidenced by a drop in pressure in the reactor to the vapor pressure of the solvent-polymer solution at the operating temperature.

In the above-described polymerization step the amount of catalyst employed represents only a very small amount of the butadiene charged. The amount of catalyst generally will not exceed 2.0 parts by weight alkali metal per 100 parts total butadiene feed charged (which includes both the initial charge of butadiene and the additional quantity of same added after initiation of polymerization) and is preferably in the range of 0.5 to 1.5 parts per 100 parts total butadiene. In most instances the catalyst will be less than 2 per cent by weight of the solvent. To be able to produce liquid polymers of controlled viscosity and exclude the formation of solid products with this small quantity of catalyst is indeed unexpected and unpredictable since it is generally regarded that large amounts of catalyst are necessary for the production of soft polymers.

The catalysts employed for this step of the process comprise finely divided suspensions of alkali metals, with sodium and potassium being most generally preferred. The preparation of the catalyst involves charging a dispersion medium such as xylene to any conventional type of reaction vessel where it is heated to a temperature above the melting point of the alkali metal, say to 100 to 115° C. in the case of sodium, in an atmosphere of dried, oxygen-free nitrogen, after which the freshly cut metal such as sodium is added. The temperature is adjusted to about 110° C. and the mixture vigorously agitated, as with an efficient stirrer operated at high speed (5,000 to 10,000 R. P. M.), for a period usually ranging from 5 to 15 minutes or until a stable dispersion is produced. The system is allowed to cool to about 100° C. when agitation is stopped. A catalyst thus prepared is ready for use in the process of this invention. If desired a dispersion stabilizer, for example, a selected mercaptan such as tertiary dodecyl mercaptan or carbon black, may be employed in the preparation of the catalyst. In the former case the amount of mercaptan used is sufficient to give a quantity of sodium mercaptide equivalent to about 0.5 to 5.0 per cent of the weight of the sodium employed, while in the latter case the amount of carbon black introduced is equivalent to from 2 to 20 per cent of the weight of the sodium used. A more complete description of the catalyst preparation using dispersion stabilizers may be found in copending applications, Serial Nos. 671,899, now Patent No. 2,483,886, and 671,900, now Patent No. 2,483,887, filed May 23, 1946.

To obtain a product of low viscosity, it is essential that the catalyst be finely dispersed, that is, that the average size of the particles be small. It is essential that the average particle size of the catalyst be below 200 microns and desirable that it be below 100 microns. It is frequently preferred that the average particle size of the catalyst be below 80 microns, say around 40 to 80 microns. As the particle size of the catalyst is increased, polymers of higher viscosity are obtained.

The catalyst dispersion above described usually contains about 5 to 35 weight per cent metal, based on the dispersing medium employed in its preparation. It is to be understood, however, that only a small portion of this dispersion is employed in a given polymerization reaction, the amount being such that the quantity of alkali metal present in the reactor charge will be as hereinbefore stated.

During the polymerization step, the reaction is continued until the concentration of polymer in the solvent reaches the desired level. An amount of solvent is used such that the per cent polymer in the final mixture does not exceed 50 weight per cent and is usually in the range of 25 to 40 per cent.

In general the time required to carry out the polymerization step, exclusive of the initial induction period, does not exceed 8 hours and it is preferably below 4 hours. The polymerization is effected as rapidly as possible since extended reaction times result in polymers of undesirably high viscosity and color. The limiting factor on butadiene addition rate after the reaction is once initiated, is the ability of the particular polymerization system to remove heat of reaction. Such heat removal may be accomplished in conventional manner, as by external cooling of relatively small reactors, internal cooling coils, or refluxing of butadiene. Pressures in the reactor will vary from not much above atmospheric when butadiene is being polymerized rapidly by a very active catalyst, on up to several atmospheres when a less active catalyst is used.

Solvents which are applicable comprise: paraffinic hydrocarbons, especially the light normally liquid paraffins such as pentanes, hexanes, heptanes, and certain naphtha fractions, preferably having not over 10 carbon atoms per molecule; cycloparaffins such as cyclohexane; aromatic hydrocarbons such as benzene, toluene, other lower alkylbenzenes, and the like.

The preferred temperature for carrying out the polymerization lies in the range from 60 to 110° C. However, a narrower temperature range of from 85 to 100° C. is most frequently chosen.

The final step in the process of this invention comprises recovery of the polybutadiene by an appropriate treating process wherein the unchanged alkali metal and reactive organo-metallic compounds are removed or converted to inactive materials which do not produce deleterious effects on the product. In order to obtain a liquid product it is necessary that the alkali metal be removed or rendered inactive since its presence promotes cross-linking of the polymer with the resultant formation of gel. Reactive organo-metallic compounds are also deleterious. They impart a pronounced color to the product which may range from dark brown or red to nearly black.

In the first part of the treating step the polymerized mixture is usually allowed to stand for a period ranging from fifteen minutes to two hours, or longer in order that excess unchanged alkali metal and any other insoluble heavy material may settle and be removed by any suitable means such as decantation, filtration, or the like.

One method by which recovery of the polymer can be effected comprises treatment with an excess of carbon dioxide. The addition of carbon dioxide may be accomplished in any manner desired such as by blowing through the solution, by introducing it into a closed reactor under pressure, or by adding it in the solid form. It is important that an excess of carbon dioxide be present in order that reactive ingredients be completely removed or rendered inactive and the dark color discharged. During this treating step the mixture is agitated in order to facilitate contact of the reactants.

If the recovery of the polymer is effected by treatment with carbon dioxide, it is frequently desirable to precede the introduction of carbon dioxide by the addition of a small quantity of water, usually an amount which ranges from 0.1 to 1.0 mol per mol of alkali metal employed, to destroy any free alkali metal catalyst that is present. It is essential that only a small quantity of water be added in order that the formation of troublesome emulsions will be prevented. The mixture is then agitated for from thirty minutes to two hours, or as long as required to insure contact of the water with the reactive materials present, after which treatment with carbon dioxide is effected as described above. Treatment with carbon dioxide alone, or with water followed by carbon dioxide, effects a sudden change in the color of the polymer solution from a very dark to light yellow or substantially colorless material. The treatment with carbon dioxide is preferably continued for some time, say 15 minutes to two hours, after the discharge of color occurs.

It is oftentimes observed that a precipitate forms after the carbon dioxide treatment. If such is the case, it is allowed to settle and may be separated readily by filtration or any other means desired. After removal of the precipitate a solution of the polymer remains. A stripping operation is then carried out to effect separation of the solvent from the polymer by vaporization of the former, whereupon the product is obtained as a substantially colorless or slightly colored, transparent liquid.

One of the methods which has been frequently employed heretofore for the recovery of diolefin polymers is the addition of water, often in relatively large quantities. This method, as hereinbefore mentioned, leads to the formation of troublesome emulsions which are difficult to break up and the product has a cloudy appearance which results from residual moisture. A further difficulty with this method lies in the fact that during the stripping operation for the removal of the solvent from the polymer, the color is intensified and an almost black material is recovered in contrast to the light colored product obtained when operating according to the method herein described.

The present invention represents an improved process for the production of a liquid polymer from butadiene, the product being superior in many respects to liquid polymers prepared by methods heretofore described. It is comprised in its entirety of low molecular weight material, i. e., it is free from solid matter which is so frequently a contaminant in liquid diolefin polymers prepared by other methods. The average molecular weight of the product will generally range from 1000 to 3000. It is a clear, transparent substance which is substantially colorless. The double bonds in the polymer are of such nature that they do not react completely under conditions ordinarily used for iodine number determinations and therefore this method for determining unsaturation is not reliable. However, the unsaturation has been determined by an iodine monochloride method which gives more significant results. For example, if a molecular weight of 2000 is assumed, the unsaturation has been found to be in the neighborhood of about 30 double bonds per molecule. This equivalent to an iodine number of about 371. Stated in a different way, the product on this basis is calculated to contain 0.79 double bond per butadiene unit.

The process employed for the production of the product herein described is dependent upon several features. It has been shown that the particle size of the catalyst is critical since if the particles exceed a certain size, a product is obtained which has a viscosity higher than is desired. The amount of catalyst must also be regulated within certain limits since too small an amount of catalyst results in the formation of rubberlike polymers. Another factor that must be carefully controlled in this process is the temperature. It is known to the art that rubberlike polymers are formed at lower temperatures than are employed in this invention and it has been found, when operating according to the process herein described, that the viscosity of the product also increases at elevated temperatures. Another important feature is the concentration of the reactants in the solvent during the polymerization, that is, the concentration of the catalyst and butadiene in the solvent at the start of the polymerization and the concentration of butadiene maintained during the reaction. The concentration of polymer in the solvent at the conclusion of the polymerization is also important. After introduction of the initial charge of butadiene, sufficient time must be allowed for initiation of the reaction after which the rate of addition of the remainder of the diolefin is carefully regulated. The successful operation of the invention is not dependent upon any one feature but upon all the process steps which must be carried out in a specific manner. While the polymer which is formed is usually colored from the presence of organo-alkali metal compounds, a suitable recovery method may be employed which will yield a clear, transparent, substantially colorless or only slightly colored liquid. One method by which recovery of the polymer can be effected has been described.

While liquid polymers have been prepared heretofore by alkali metal catalyzed polymerizations, it has now been found that by controlling the aforementioned steps in the manner described, it is not only possible to obtain a product of exceptionally good color but a polymer of lower viscosity which is free from solid polymeric material results, and it is produced with a smaller charge of catalyst than has been disclosed in the art. In former processes the point of major concern has been merely the production of butadiene polymers with no particular emphasis placed upon specific operating steps to produce materials which are uniform and which conform to certain specifications. Along with recent developments there have been increasing demands for products of greater uniformity and specific application. The process of the present invention affords a means whereby the production of liquid polymers of controlled viscosity and wide adaptability are obtained.

While this invention has been described with reference to the production of liquid polybutadiene, it is also applicable to other polymerizations in which 1,3-butadiene is the essential ingredient. For example, it is applicable to the polymerization of 1,3-butadiene with materials copolymerizable therewith and such materials include other conjugated diolefins such as isoprene, piperylene, 2,3-dimethylbutadiene, and the like, and vinyl compounds such as styrene, methyl substituted styrenes, etc. In all such polymerizations the major polymerizable ingredient is 1,3-butadiene and this component is present in an amount which exceeds 50 weight per cent of the monomeric material.

The polybutadiene products of this invention are adapted to many uses, one of the most important of which is as an additive to drying oils. Particularly semi-drying oils such as soy-bean oil, cottonseed oil and the like, have their bodying and drying characteristics improved by addition of my polybutadiene products. The products are also useful as tackifiers and/or plasticizers for both synthetics and natural rubbers.

While the process has been described hereinabove as a batch operation, it may also be carried out in a continuous manner. Butadiene, solvent, and catalyst suspension are introduced into a reactor in continuous flow streams, or by periodic increments if desired, and a portion of the total reaction mixture is removed from the reactor as a continuous stream, or periodically especially if the feed streams are so fed, to maintain an essentially constant quantity of material in the reactor. Since in first starting a polymerization run, either batch or continuous, there is an induction period before polymerization starts, a continuous process is generally initiated by first charging the reactor and waiting till the polymerization reaction has started, and then beginning the continuous or intermittent addition of reactant, solvent and catalyst. In any continuous run, the reactor effluent contains appreciable amounts of unreacted butadiene, and usually has a lower polymer content than the product of a batch operation in which polymerization has been allowed to go to completion. Preferably the addition and withdrawal of materials is at such a rate as to permit the formation and maintenance of polybutadiene in a concentration of at least 15 weight per cent in the reaction mixture. Unreacted butadiene, and solvent, are recovered by distillation from the polymer, and recycled to the reactor. Ordinarily butadiene is first flashed, the solvent-polymer-catalyst mixture is then settled, any catalyst which thereby separates out is returned to the reactor, the solvent-polymer mixture is then subjected to the carbon dioxide or water and carbon dioxide treatment described, and solvent is finally distilled from the finished polymer product and recycled to the reactor.

The following examples are offered to illustrate certain features of the invention, and it will be understood that all of the specific conditions and limitations given are not necessarily coextensive with the broad scope of the invention as defined in the claims.

*Example 1*

A mixture of 2.4 pounds benzene and 0.016 pound sodium dispersed in xylene was charged to a stainless steel, jacketed autoclave equipped with a stirrer. The mixture was heated to a temperature of 90° C., the stirrer was started, and 0.24 pound of 1,3-butadiene, previously treated for the removal of 1,2-butadiene and other deleterious materials, was introduced, resulting in a reactor pressure of 30 pounds per square inch gauge. After polymerization started 1.36 pounds additional 1,3-butadiene was added over a period of four hours, equivalent to an average rate of 0.142 pound of butadiene per hour per pound of solvent in the reactor. The temperature was maintained at 90° C. throughout the polymerization. Subsequent to the addition of the diolefin, stirring was continued for a short time until the reaction pressure indicated the substantially complete reaction of the butadiene. The polymer solution as withdrawn from the reactor was a very dark colored material. It was allowed to stand quiescent 30 minutes to permit settling of the catalyst, and the polymer solution was then decanted from the unchanged sodium.

To the dark colored polymer solution 0.012 pound of water was added and the mixture stirred vigorously for one hour at room temperature. Stirring was continued while a stream of carbon dioxide was introduced near the bottom of the solution. The reaction was carried out at atmospheric pressure. After a period of five to ten minutes the color of the solution changed abruptly from reddish-brown to pale yellow and a precipitate appeared. Carbon dioxide was bubbled through the solution for an hour to maintain a state of saturation after which agitation was stopped and the precipitate allowed to settle. The clear, supernatant liquid was decanted and the solvent stripped from the polymer by heating at 100° C. under 30 mm. pressure. A clear, transparent, light yellow liquid remained.

1,3-butadiene was polymerized in the manner described above and 0.012 pound of water was added. The mixture was stirred vigorously for one hour after which it was divided into two equal portions. One portion was stripped immediately. During this operation the already dark color was intensified and an almost black product was obtained. To the other portion a large excess of water was added (approximately a volume equal to the volume of the polymer solution). When the mixture was stirred water became emulsified with the oil. The product obtained after stripping was nearly black and was also cloudy on account of the presence of residual moisture which could not be removed by this treatment.

*Example II*

A mixture of 3.24 pounds benzene and 0.016 pound sodium dispersed in xylene was charged to a reactor as in Example I, and the mixture was heated to 90° C. Stirring was started and 0.77 pound butadiene, previously treated for the removal of deleterious materials, was added, resulting in a reactor pressure of 55 pounds per square inch gauge. After polymerization started 1.14 pounds additional 1,3-butadiene was added during a period of 1.8 hours equivalent to an average rate of 0.196 pound of butadiene per hour per pound of solvent in the reactor. The temperature was maintained at about 90° C. throughout the polymerization. Stirring was continued for a short time as before, and the product recovered as described in Example I. A pale yellow liquid was obtained which weighed 1.8 pounds and had a viscosity of 6824 Saybolt Universal seconds at 100° F.

*Example III*

A mixture of 3.24 pounds benzene and 0.016 pound sodium dispersed in xylene was charged to a reactor as in Example I, and the mixture was heated to 95° C. Stirring was started and 0.88 pound butadiene, previously treated for the removal of harmful materials, was added, resulting in a reactor pressure of 70 pounds per square inch gauge. After polymerization started 1.0 pound additional 1,3-butadiene was added during a period of one hour, equivalent to an average rate of 0.31 pound of butadiene per hour per pound of solvent in the reactor. The temperature was maintained at substantially 95° C. throughout the polymerization. Stirring was continued for a short time to allow substantially complete reaction of the butadiene, and the product was recovered in the manner described in Example I. A pale yellow liquid was obtained which had a viscosity of 5428 Saybolt Universal seconds at 100° F.

*Example IV*

A mixture of 3.24 pounds benzene and 0.016 pound sodium dispersed in xylene was charged to a reactor as in Example I, and the mixture was heated to 98° C. Stirring was started and 0.55 pound butadiene, previously treated for the removal of harmful materials, was added, resulting in a reactor pressure of 55 pounds per square inch gauge. After polymerization started 1.23 pounds additional 1,3-butadiene was added during a period of 1.25 hours, equivalent to an average rate of 0.30 pound of butadiene per hour per pound of solvent in the reactor. The temperature was maintained at about 98° C. throughout the polymerization. Stirring was continued for a short time to allow substantially complete reaction of the butadiene, and the product was recovered in the manner described in Example I. A pale yellow liquid was obtained which had a viscosity of 7042 Saybolt Universal seconds at 100° F.

*Example V*

A mixture of 3.24 pounds benzene and 0.016 pound sodium dispersed in xylene was charged to a reactor as in Example I, and the mixture was heated to 70° C. Stirring was started and 0.44 pound butadiene, previously treated for the removal of harmful materials, was added, resulting in a reactor pressure of 30 pounds per square inch gauge. After polymerization started 1.66 pounds additional 1,3-butadiene was added during a period of 5.7 hours, equivalent to an average rate of 0.09 pound of butadiene per hour per pound of solvent in the reactor. The temperature was maintained at 70° C. throughout the polymerization. Stirring was continued for a short time to allow substantially complete reaction of the butadiene, and the product was recovered in the manner described in Example I. A pale yellow liquid was obtained which had a viscosity of 8562 Saybolt Universal seconds at 100° F.

*Example VI*

A mixture of 3.95 pounds n-heptane and 0.0155 pound sodium dispersed in xylene was charged to a reactor as in Example I, and the mixture was heated to 88° C. Stirring was started and 0.3 pound butadiene, previously treated for the removal of harmful materials, was added, resulting in a reactor pressure of 20 pounds per square inch gauge. After polymerization started 1.4 pounds additional 1,3-butadiene was added at a constant rate during a period of 2 hours, equivalent to a rate of 0.177 pound of butadiene per hour per pound of solvent in the reactor. The temperature was controlled at about 88° C. throughout the polymerization. Stirring was continued for a short time to allow substantially complete reaction of the butadiene, and the product was recovered in the manner described in Example I. A pale yellow liquid of low viscosity was obtained.

*Example VII*

A mixture of 2.45 pounds n-heptane and 0.008 pound sodium dispersed in xylene was charged to a reactor as in Example I, and the mixture was heated to a temperature of 125° C. Stirring was started and 0.11 pound butadiene, previously treated for removal of harmful materials, was added, resulting in a reactor pressure of 25 pounds per square inch gauge. After polymerization started 0.70 pound additional butadiene was added during a period of 1.1 hours, equivalent to an average rate of 0.26 pound of butadiene per hour per pound of solvent in the reactor. The temperature was maintained at 125° C. throughout the polymerization. Stirring was continued for a short time as before, and the product was removed from the reactor. The polymerized material was unusually sticky and dark, and was much more viscous than the polymers prepared at the lower temperatures. Further, about 20 per cent of the polymer was a non-sticky, solid polymer which exhibited no tendency to swell or soften in benzene.

Example VIII

A mixture of 3.95 pounds of n-heptane and 0.013 pound sodium dispersed in xylene was charged to a reactor as in Example I, and the mixture was heated to about 87° C. Stirring was started and 0.4 pound of a mixture of monomers, consisting of 77 per cent 1,3-butadiene and 23 per cent styrene by weight, was added, resulting in a pressure of 25 pounds per square inch gauge. After polymerization started 0.9 additional pound of the monomer mixture was added during a period of 4.3 hours, equivalent to an average rate of 0.053 pound of the monomer mixture per hour per pound of solvent in the reactor. The reactor temperature was maintained in the range from 87 to 91° C. throughout the polymerization. After the reaction was substantially complete the sodium was settled out; the dark colored polymer solution was decanted, treated to remove organo-sodium compounds and stripped free of the solvent. The resulting polymer was a pale yellow liquid of low viscosity.

Example IX

The series of polymerizations was carried out to show the effect of concentration of the sodium catalyst on the polymerization rate and the viscosity of the liquid polymer product. In each experiment 2.4 pounds benzene was first charged to the reactor with varying amounts of sodium dispersed in xylene. All the polymerizations were carried out substantially at 90° C., at a constant pressure of 40 pounds per square inch gauge, and with a total addition of 1,3-butadiene monomer amounting to 1.6 pounds. In these runs the butadiene addition was controlled at a rate such that a constant pressure was maintained. In this way the concentration of monomers was held approximately constant so that the effect of catalyst concentration could be observed. The following table summarizes the results using three catalyst concentrations. In each case the catalyst used was from the same batch.

| Sodium Wt. Percent of Solvent | Butadiene Added. Wt. Percent of Total Charge, After— | | | | | | | Polymer Viscosity, Saybolt Universal Seconds at 100° F. |
|---|---|---|---|---|---|---|---|---|
| | 0.5 Hours | 1 Hour | 1.5 Hours | 2 Hours | 2.5 Hours | 3 Hours | 4 Hours | |
| 0.23 | 13.8 | | 42.0 | 56.5 | | 81.0 | 100 | 15,260 |
| 0.50 | 15.3 | 34.0 | 55.0 | 69.5 | 85.0 | 100 | | 6,574 |
| 1.00 | 32.8 | 100.0 | | | | | | 1,776 |

While all the products were liquids, there was considerable variation in viscosity. The data also show that when a constant pressure is maintained, the catalyst concentration greatly affects the reaction rate.

Example X

A series of polymerizations was carried out to demonstrate the effect of catalyst particle size on the viscosity of the polymer. In each experiment a mixture of 3.95 pounds n-heptane and 0.017 pound sodium dispersed in xylene was charged to the reactor as in Example I. The mixture was heated to about 90° C., the stirrer was started, and about 0.4 pound of 1,3-butadiene, previously treated for the removal of deleterious materials, was introduced. After polymerization started 1.3 pounds additional butadiene was added over a period of approximately 2.5 hours. The temperature was maintained at substantially 90° C. throughout the polymerization reaction. Stirring was continued for a short time as before, and the product recovered as described in Example I. The average particle size of the catalyst employed in each polymerization, together with the viscosity of the product is shown in the table. Since the viscosity of some of the products was so high, the values are all reported in Saybolt Furol seconds (multiplying by 10 gives approximate values in Saybolt Univeral seconds).

| Particle Size of Sodium Catalyst, Microns | Viscosity Saybolt Furol Seconds at 100° F. |
|---|---|
| 37 | 434 |
| 45 | 1,124 |
| 63 | 1,681 |
| 117 | 4,960 |
| 191 | 9,410 |

Example XI

Runs were made in which the sodium-catalyzed reaction was used to prepare liquid polybutadiene in a continuous process. The runs were started in the batch manner as described above. An initial charge of butadiene was added to a suspension of catalyst in normal heptane solvent in a one gallon stirred reactor, and after polymerization was initiated butadiene was charged continuously for sufficient length of time to build up the polymer content of the reaction mixture. The length of time required from the addition of the initial charge of butadiene to the end of this batch portion is set forth in the table hereinbelow. Addition of butadiene was then stopped and the continuous portion of the run was started and carried out by continuously adding a charge mixture of 30 per cent butadiene in normal heptane. Temperature was maintained between about 85 and 95° C. A portion of the reaction mixture was removed from the reactor at 20 minute intervals to maintain an approximately even level in the vessel. At the same frequency, incremental charges of sodium catalyst were introduced, the catalyst charges being such that two hours were required to introduce an amount equivalent to the original catalyst. The flow of heptane-butadiene mixture was also controlled to give a two hour residence time.

Data from the continuous runs are shown in the table below. The products of each run were accumulated in four or five fractions, each being made up of several successive portions withdrawn at 20 minute intervals as described above. The period of time required for accumulation of each fraction is set forth in the table. The last fraction (4 in run A and 5 in run B) was made up of the contents of the reactor. Each of the fractions was treated for recovery of the liquid polybutadiene, and the viscosity of the latter determined. The polymer content of effluent listed in the table was calculated after dissolved butadiene had been vaporized from the polymer-heptane mixture.

| Run | Time, Hours | | Product Fraction | Fraction Collection Time, Hours | | Maximum Press., p.s.i.g. | Polymer Content of Effluent, Wt. Percent | Viscosity, Saybolt Furol Seconds at 100° F. |
|---|---|---|---|---|---|---|---|---|
| | Initial Batch Portion | Continuous Portion | | Cumulative | Per Fraction | | | |
| A | 3 | 5.75 | 1 | 0–1.75 | 1.75 | 10 | 17.4 | 1,320 |
| | | | 2 | 1.75–3.42 | 1.67 | 9 | 12.9 | 1,430 |
| | | | 3 | 3.42–5.42 | 2.00 | 25 | 19.0 | 1,018 |
| | | | 4 | 5.42–5.75 | 0.33 | 25 | 25.5 | 1,462 |
| B | 2.5 | 7.5 | 1 | 0–2.17 | 2.17 | 12 | 18.8 | 838 |
| | | | 2 | 2.17–4.17 | 2.00 | 25 | 19.9 | 1,400 |
| | | | 3 | 4.17–5.83 | 1.66 | 29 | 33.0 | 1,625 |
| | | | 4 | 5.83–7.50 | 1.67 | 28 | 36.9 | 1,616 |
| | | | ¹5 | | | 20 | 30.8 | 1,980 |

¹ Reactor contents.

It was observed that in the early stages of the continuous operation the catalyst apparently was not sufficiently active to convert the butadiene as rapidly as charged. As a result there occurred a gradual increase in pressure as the reaction proceeded, and effluent recovered in the early period of the reaction contained much less than the theoretical 30 per cent polymer content. The runs were lined out satisfactorily at reasonably steady-state conditions, and were terminated after the periods shown above.

I claim:

1. A method for the production of liquid polybutadiene free from solid polymers and of high transparency and low color which comprises adding an initial charge of a butadiene polymerization feed of at least 98.0 weight per cent 1,3-butadiene purity and free from 1,2-butadiene to a stable dispersion of finely divided alkali metal catalyst having an average particle size of less than 200 microns in a body of liquid hydrocarbon solvent in a closed reaction vessel, said initial charge comprising from 0.03 to 0.15 pound butadiene per pound of solvent and said catalyst not exceeding 2.0 parts by weight per 100 parts total butadiene feed charged, maintaining the resulting reaction mixture at 60 to 110° C., while agitating same until polymerization is initiated, then charging additional butadiene feed to the reaction mixture while agitating same and maintaining same at 60 to 110° C., said additional butadiene being added at a constant rate of from 0.03 to 0.4 pound per hour per pound of solvent as rapidly as possible without causing the reaction mixture temperature to rise above 110° C. to form a final polymer-solvent reaction mixture containing not in excess of 50 weight per cent of polybutadiene, continuing agitation of the reaction mixture after addition of butadiene feed is stopped until remaining butadiene is polymerized, allowing the reaction mixture to settle with formation of an insoluble heavy layer, separating said heavy layer, contacting the remaining solution of polybutadiene in solvent with an excess of carbon dioxide while under vigorous agitation until the dark color of the reaction mixture is discharged and continuing this treatment with an excess of carbon dioxide for at least 15 minutes after said discharge of color and then removing any precipitate formed thereby, and separating the solvent from the polymer to produce a clear low-color liquid polybutadiene polymer free from solid polymer in suspended or dissolved form.

2. The method of claim 1 wherein said alkali metal is sodium.

3. The method of claim 1 wherein said liquid hydrocarbon solvent is a light normally liquid paraffin.

4. The method of claim 3 wherein said solvent is normal heptane.

5. The method of claim 1 wherein said liquid hydrocarbon solvent is benzene.

6. The method of claim 1 wherein the reaction mixture is maintained at 80 to 95° C.

7. The method of claim 1 wherein the quantity of catalyst is in the range of 0.5 to 1.5 parts by weight per 100 parts total butadiene feed charged.

8. The method of claim 1 wherein the catalyst has an average particle size of less than 100 microns and is sodium metal.

9. The method of claim 1 wherein said additional butadiene feed is added over a period of less than four hours to form a final polymer-solvent solution containing from 25 to 40 weight per cent polybutadiene.

10. The method of claim 1 wherein after separating said heavy layer and before treating with carbon dioxide the polymer solution is treated with water by admixing with the reaction mixture from 0.1 to 1.0 mol of water per mol of alkali metal catalyst initially employed, vigorously agitating the admixture for a time ranging from 30 minutes to 2 hours sufficient to effect intimate contact of water with residual alkali metal and metallo-organic complexes, and then treating with an excess of carbon dioxide as described.

11. A continuous method for the production of liquid polybutadiene free from solid polymers and of high transparency and low color which comprises continuously maintaining an approximately constant volume of reaction mixture comprising a highly agitated stable dispersion of finely divided alkali metal catalyst having an average particle size of less than 200 microns in a body of liquid hydrocarbon solvent containing butadiene and polybutadiene in a closed reaction vessel at a temperature ranging from 60 to 110° C., introducing a butadiene polymerization feed of at least 98.0 weight per cent 1,3-butadiene purity and free from 1,2-butadiene, hydrocarbon solvent, and catalyst into said body of liquid reaction mixture and withdrawing equivalent quantities of reaction mixture therefrom to maintain an approximately constant volume at a rate permitting the formation and maintenance of polybutadiene in a concentration of at least 15 weight per cent but not in excess of 50 weight per cent in said reaction mixture exclusive of butadiene, the quantity of catalyst employed being not in excess of 2.0 parts by weight per 100 parts total butadiene feed employed, recovering unreacted butadiene from the withdrawn portion of the reaction mixture and returning same to the reactor as part of said butadiene feed and separating insoluble heavy material from the solution of polymer in solvent, deactivating alkali metal and metallo-organic complexes contained in said solution, vaporizing the solvent from the polymer and returning the former to the reactor, and recovering a clear low-color liquid polybutadiene polymer free from solid polymer in suspended or dissolved form.

12. The method of claim 1 wherein an unsaturated organic compound copolymerizable with butadiene is employed as a reactant in an amount by weight less than the butadiene to form a copolymeric product, said compound being calculated as part of the butadiene feed in determining the quantities of same added.

13. The method of claim 12 wherein styrene in minor amount is admixed with the butadiene feed and a liquid butadiene-styrene copolymer is produced.

14. The method of claim 1 wherein said alkali metal catalyst is supplied to the reaction as a dispersion of sodium metal in liquid xylene which has been prepared by heating sodium metal with xylene at 100 to 115° C. while vigorously agitating by high speed stirring until a stable dispersion is produced in which the sodium metal particles have an average particle size of less than 200 microns.

15. A continuous method for the production of liquid polybutadiene free from solid polymers and of high transparency and low color which comprises continuously maintaining an approximately constant volume of reaction mixture comprising a highly agitated stable dispersion of finely divided sodium metal catalyst having an average particle size of less than 200 microns in a body of liquid hydrocarbon solvent containing 1,3-butadiene and polybutadiene in a closed reaction vessel at a temperature ranging from 60 to 110° C., introducing a high-purity 1,3-butadiene feed, hydrocarbon solvent, and catalyst into said body of liquid reaction mixture and withdrawing equivalent quantities of reaction mixture therefrom to maintain an approximately constant volume at a rate permitting the formation and maintenance of polybutadiene in a concentration of at least 15 weight per cent but not in excess of 50 weight per cent in said reaction mixture exclusive of butadiene, the quantity of catalyst employed being not in excess of 2.0 parts by weight per 100 parts total butadiene feed employed, recovering unreacted butadiene from the withdrawn portion of the reaction mixture and returning same to the reactor as part of said butadiene feed and separating insoluble heavy material from the solution of polymer in solvent, deactivating sodium metal and metallo-organic complexes contained in said solution, vaporizing the solvent from the polymer and returning the former to the reactor, and recovering a clear low-color liquid polybutadiene polymer free from solid polymer in suspended or dissolved form.

16. A method for the production of liquid polybutadiene free from solid polymers and of high transparency and low color which comprises adding sufficient to initiate polymerization of an initial charge of a high-purity 1,3-butadiene feed to a stable dispersion of finely divided alkali metal catalyst having an average particle size of less than 200 microns in a body of liquid hydrocarbon solvent in a closed reaction vessel, said catalyst not exceeding 2.0 parts by weight per 100 parts total butadiene feed charged, maintaining the resulting reaction mixture at 60 to 110° C. while agitating same until polymerization is initiated, then charging additional butadiene feed to the reaction mixture while agitating same and maintaining same at 60 to 110° C., said additional butadiene being added at as rapid a rate as possible without causing the reaction mixture temperature to rise above 60 to 110° C. until a final polymer-solvent reaction mixture is formed containing not in excess of 50 weight per cent of polybutadiene, deactivating alkali metal and metallo-organic complexes contained in the solution of polymer in solvent, and separating the solvent from the polymer to produce a clear low-color liquid polybutadiene polymer free from solid polymer in suspended or dissolved form.

17. A method for the production of liquid polybutadiene free from solid polymers and of high transparency and low color which comprises adding an initial charge of from 0.03 to 0.15 part by weight of a high-purity 1,3-butadiene feed per part of solvent to a stable dispersion of finely divided sodium metal catalyst having an average particle size of less than 100 microns in a body of liquid hydrocarbon solvent in a closed reaction vessel, said catalyst not exceeding 2.0 parts by weight per 100 parts total butadiene feed charged, maintaining the resulting reaction mixture at 80 to 95° C. while agitating same until polymerization is initiated, then charging additional butadiene feed to the reaction mixture while agitating same and maintaining same at 80 to 95° C., said additional butadiene being added as rapidly as possible without causing the reaction mixture temperature to rise above 80 to 95° C. until a final polymer-solvent reaction mixture is formed containing not in excess of 50 weight per cent of polybutadiene, allowing the reaction mixture to settle with formation of an insoluble heavy layer, separating said heavy layer, and deactivating sodium metal and metallo-organic complexes contained in said solution to produce a clear low-color solution of liquid polybutadiene polymer free from solid polymer in suspended or dissolved form.

18. The method of claim 16 wherein said 1,3-butadiene feed is pretreated with bauxite.

WILLIE W. CROUCH.

REFERENCES CITED

The following references are of record in the file of this patent:

FOREIGN PATENTS

| Number | Country | Date |
|---|---|---|
| 337,019 | Great Britain | Oct. 27, 1930 |
| 545,193 | Great Britain | May 14, 1942 |

OTHER REFERENCES

Tschajanov, "Brit. Chem. Abst. B," supp. to "Jour. Soc. Chem. Ind.," page 229, col. 1, Mar. 13, 1936.